(12) United States Patent
Zalich et al.

(10) Patent No.: US 7,589,141 B2
(45) Date of Patent: Sep. 15, 2009

(54) ORGANIC-INORGANIC POLYMER COMPOSITES AND THEIR PREPARATION BY LIQUID INFUSION

(75) Inventors: Michael A. Zalich, Pittsburgh, PA (US); Gregory J. McCollum, Gibsonia, PA (US); Thomas G. Rukavina, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 291 days.

(21) Appl. No.: 11/610,651

(22) Filed: Dec. 14, 2006

(65) Prior Publication Data

US 2008/0146716 A1 Jun. 19, 2008

(51) Int. Cl.
*C08L 75/04* (2006.01)
*C08K 3/20* (2006.01)

(52) U.S. Cl. ........................... 524/430; 524/590
(58) Field of Classification Search .............. 524/430, 524/590
See application file for complete search history.

(56) References Cited

U.S. PATENT DOCUMENTS

| | | | | |
|---|---|---|---|---|
| 4,400,374 A * | 8/1983 | Cardarelli | ................... | 424/486 |
| 5,190,698 A | 3/1993 | Coltrain et al. | ............. | 252/518 |
| 5,252,654 A | 10/1993 | David et al. | ................. | 524/414 |
| 5,412,016 A | 5/1995 | Sharp | ......................... | 524/430 |
| 5,459,198 A | 10/1995 | Sharp | ......................... | 525/102 |
| 5,462,704 A * | 10/1995 | Chen et al. | ..................... | 264/41 |
| 5,648,149 A * | 7/1997 | Rukavina et al. | ............. | 428/215 |
| 5,703,173 A | 12/1997 | Koloski et al. | ........... | 525/326.2 |
| 5,726,247 A | 3/1998 | Michalczyk et al. | ........ | 525/102 |
| 5,977,241 A | 11/1999 | Koloski et al. | .............. | 524/502 |
| 6,232,386 B1 | 5/2001 | Vargo et al. | ................. | 524/434 |
| 6,265,715 B1 * | 7/2001 | Perreault et al. | ............ | 250/288 |
| 6,359,034 B1 * | 3/2002 | Visel et al. | .................. | 523/212 |
| 6,428,887 B1 | 8/2002 | Vargo et al. | ................. | 428/343 |
| 6,531,076 B2 * | 3/2003 | Crano et al. | ................ | 252/586 |
| 6,548,590 B1 | 4/2003 | Koloski et al. | .............. | 524/492 |
| 6,607,590 B2 * | 8/2003 | Jin et al. | ................ | 106/287.12 |
| 6,608,129 B1 | 8/2003 | Koloski et al. | .............. | 524/403 |
| 6,790,526 B2 | 9/2004 | Vargo et al. | ................. | 428/343 |
| 7,144,969 B2 * | 12/2006 | McDonald | ................... | 528/63 |
| 7,233,068 B2 * | 6/2007 | Ramachandrarao et al. | . | 257/741 |
| 7,455,886 B2 * | 11/2008 | Rao et al. | ................. | 427/385.5 |
| 2002/0127330 A1 * | 9/2002 | Jin et al. | ..................... | 427/162 |
| 2002/0157789 A1 * | 10/2002 | Imai et al. | ................. | 156/331.7 |
| 2005/0164008 A1 * | 7/2005 | Rukavina | ..................... | 428/412 |
| 2005/0277349 A1 * | 12/2005 | Smith et al. | .................... | 442/59 |
| 2005/0277721 A1 * | 12/2005 | Smith et al. | ................. | 524/430 |
| 2006/0047058 A1 * | 3/2006 | Lu et al. | ..................... | 524/497 |
| 2006/0134161 A1 * | 6/2006 | Halliday et al. | ............. | 424/422 |
| 2007/0042174 A1 * | 2/2007 | Rao et al. | .................... | 428/323 |
| 2007/0066491 A1 * | 3/2007 | Bicerano et al. | ............ | 507/117 |
| 2007/0148471 A1 * | 6/2007 | Rukavina et al. | ......... | 428/423.1 |
| 2007/0254107 A1 * | 11/2007 | Rao et al. | ................. | 427/372.2 |
| 2009/0022995 A1 * | 1/2009 | Graham et al. | .............. | 428/409 |

OTHER PUBLICATIONS

New Epoxy/Silica-Titania Hybrid Materials Prepared by the Sol-Gel Process. Journal of Applied Polymer Science. 2006.*
Reinforcement of poly(dimethylsiloxane) networks by blended and in-situ generated silica fillers having various sizes, size distributions, and modified surfaces by Wendy Yuan and James E. Mark; *Macromol. Chem. Phys.* 200, 206-220 (1999).
Synthesis, Structure, and Properties of Hybrid Organic-Inorganic Composites Based on Polysiloxanes. I. Poly(Dimethylsiloxane) Elastomers Containing Silica by D. W. McCarthy, J. E. Mark, and D. W. Schaefer; *Journal of Polymer Science: Part B: Polymer Physics*, vol. 36, 1167-1189 (1998).
Modeling Interband Transitions in Silver Nanoparticle—Fluoropolymer Composites by Kevin C. See, James B. Spicer, John Brupbacher, Dajie Zhang, and Terrence G. Vargo; *J. Phys. Chem. B* 2005, 109, 2693-2698.
Polymers with Palladium Nanoparticles as Active Membrane Materials by J. Yu, R. Y. F. Liu, B. Poon, S. Nazarenko, T. Koloski, T. Vargo, A. Hiltner, and E. Baer; *Journal of Applied Polymer Science*, vol. 92, 749-756 (2004).
Preparation and Characterization of Some Unusually Transparent Poly(dimethylsiloxane) Nanocomposites by Guru S. Rajan, Gil S. Sur, James E. Mark, Dale W. Schaefer, and Gregory Beaucage; *Journal of Polymer Science: Part B: Polymer Physics*, Vol. 41, 1897-1901 (2003).
Fabrication of Metal and Metal-Oxide Macromolecular Networks Within Fluoropolymer Free Volumes; Timothy S. Koloski and Terrence G. Vargo, Integument Technologies, Incorporated.

* cited by examiner

*Primary Examiner*—Mark Eashoo
*Assistant Examiner*—Noah Frank
(74) *Attorney, Agent, or Firm*—Diane R. Meyers

(57) ABSTRACT

Polymer composites comprising a thermoset polymeric phase and an inorganic particulate phase and a method for preparing the composites are disclosed.

12 Claims, No Drawings

ORGANIC-INORGANIC POLYMER COMPOSITES AND THEIR PREPARATION BY LIQUID INFUSION

FIELD OF THE INVENTION

The present invention relates to organic-inorganic polymer composites and to their methods of preparation.

BACKGROUND OF THE INVENTION

It is known to blend organic polymers with inorganic particulate materials in order to improve certain properties of the polymer. Typically, the organic polymer and the inorganic particulate material are milled together under high shear conditions. Often the milling process degrades the polymer resulting in some poor performance properties. A more elegant way to introduce an inorganic component into an organic polymer is to dissolve the organic polymer in an organic solvent that contains a dissolved or dispersed inorganic component. The inorganic component infuses into the polymer to form an inorganic phase intimately mixed in the polymer phase. Such a process, however, is limited to thermoplastic polymers in that it is believed that it is necessary to completely solubilize the polymer and the inorganic component.

Another way of introducing the inorganic component into the polymer is to disperse the inorganic component into the monomers used to prepare the polymer and to polymerize the monomers. However, many inorganic species will interfere with the polymerization reaction. For example, with polyurethanes prepared from polyisocyanates and polyols, the use of inorganic phases based on metal alkoxides can generate alcohols that are reactive with isocyanates and the metal may catalyze the urethane forming reaction leading to undesirable results.

SUMMARY OF THE INVENTION

The present invention relates to a polymer composite comprising:
(a) a thermoset polymeric phase, and
(b) an inorganic particulate phase infused into the polymeric phase.

The composite is prepared by
(a) contacting the thermoset polymer with a solution of a precursor of an inorganic particulate phase so as to swell the thermoset polymer,
(b) infusing the precursor into the surface region of the thermoset polymer, and
(c) subjecting the infused precursor to conditions sufficient to form an inorganic particulate phase dispersed in the thermoset polymer.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "thermoset polymer" means a polymer that "sets" irreversibly upon curing or crosslinking. Once cured, a crosslinked thermoset polymer will not melt upon the application of heat and is insoluble in solvents. By contrast, the thermoplastic polymer undergoes liquid flow upon heating and is soluble in solvents.

The term "polyurethane" is intended to include not only polyurethanes that are formed from the reaction of polyisocyanates and polyols but also poly(urethane-ureas), which are prepared from the reaction of polyisocyanates with polyols and polyamines.

The term "aliphatic" is meant to include cycloaliphatic.

The term "polymer" is meant to include copolymer and oligomer.

The term "metal" is meant to include metalloid.

The term "infusion" means to penetrate from the liquid phase.

The thermoset polymeric phase can be selected from a variety of thermosetting polymers such as thermosetting polyurethanes, thermosetting polyesters, thermosetting resins derived from polyepoxides, phenolic resins, urea-formaldehyde resins, melamine-formaldehyde resins, polyimides such as bismaleimides and high temperature polyimides such as PMR and DMBZ polyimides. However, thermosetting polyurethanes are preferred.

The thermosetting polyurethane can be prepared by reacting a polyisocyanate with a polyol component and optionally with a polyamine in which one or all of the components have a functionality greater than 2. For example, a diisocyanate can be reacted with a polyol compound having an average functionality greater than 2, for example, a triol or higher functionality polyol, or a mixture of a triol or higher functionality polyol and a diol. Also, the polyisocyanate can have a functionality greater than 2 such as a triisocyanate and can be reacted with a polyol and optionally a polyamine having a functionality of 2 or more.

The thermosetting polyurethane can be prepared by the "one-shot" or by the "prepolymer" method. In the one-shot method, all of the reactants are charged to a reaction vessel and reacted together. In the prepolymer method, an excess of polyisocyanate is reacted with a portion of the polyol component to form an isocyanate prepolymer. The prepolymer is then reacted with the remaining polyol to form the thermosetting polyurethane.

The following exemplary monomers can be used to prepare the thermoset polyurethane: aliphatic including cycloaliphatic bifunctional isocyanates such as 1,6-hexamethylene diisocyanate and 2,2,4- and 2,4,4-trimethyl-1,6-hexane diisocyanate, bis(4-isocyanatocyclohexyl)methane, bis(3-methyl-4-isocyanatocyclohexyl)methane, 2,2-bis(4-isocyanatocyclohexyl)propane and 3-isocyanato-3,5,5-trimethylcyclohexyl isocyanate and isophorone diisocyanate or their tri or higher functionality biurets and isocyanurates, such as the isocyanurate of 1,6-hexmethylene diisocyanate and the isocyanurate of isophorone diisocyanate. Aromatic polyisocyanates such as 2,4-toluene diisocyanate or meta-phenylene diisocyanate may also be used. However, aliphatic polyisocyanates are preferred when the composite of the invention is to be exposed to visible or ultraviolet radiation.

The polyols that are to be used can be diols having from 2 to 12 carbon atoms. Aliphatic diols are preferred. Examples include ethylene glycol, 1,4-butanediol, 1,6-hexanediol and 2-methyl-2-n-propyl-1,3-propanediol.

Higher functionality polyols having a functionality of 3 or more, for example, from 3 to 10, can also be used. Examples of such polyols are branched aliphatic polyols having from 4 to 12 carbon atoms. Examples include trimethylolpropane, trimethylolheptane, trimethylolethane, pentaerythritol and sorbitol. Mixtures of diols and higher functionality polyols can be used. Typically, the equivalent ratio of diol to higher functionality polyol will be about 0.1 to 20:1, preferably 0.1 to 9:1, such as 1 to 5:1.

Optionally, a polyamine having a functionality of 2 or more, typically from 2 to 4, can be used with the polyol component. Examples of suitable polyamines are aliphatic polyamines having from 2 to 12 carbon atoms such as ethylenediamine and diethylenetriamine. Aromatic polyamines having from 6 to 20 carbon atoms such as various isomers of phenylenediamine and p,p-methylenedianiline can be used; however, aliphatic polyamines are preferred. The polyamines, if used, are present in amounts up to 9, preferably no more than 1 equivalent per equivalent of polyol. Other optional reactants are polymeric polyols such as polyether polyols and polyester polyols having a number average molecular weight of from 400 to 4000; the molecular weight being determined by gel permeation chromatography using a polystyrene standard. If used, the polymeric polyol is present in amounts of about 1 to 60, such as 10 to 60, preferably 10 to 25 percent by weight based on total polyol weight. The composition can optionally contain a catalyst such as dibutyltin dilaurate, typically present in amounts of 0.1 to 2.0 percent by weight based on weight of polyurethane reactants.

The thermoset polyurethane is typically prepared by mixing the reactants and heating in a reaction vessel under vacuum to remove any entrapped gases. The reaction mixture can then be cast between two sealed and spaced apart glass plates that have been treated with a release agent. The assembly containing the polyurethane reaction mixture is then heated at a temperature of from 90 to 170° C. for about 30 minutes to 24 hours to cure the polyurethane. The assembly is then cooled and the thermoset polyurethane removed from the assembly.

The inorganic particulate phase associated with the composites of the invention is preferably a metal oxide. The metal oxide phase can be incorporated into the polymeric phase by using a precursor of the metal oxide phase dissolved in a solvent that is used to swell the thermoset polymer. Examples of suitable precursors are tetraethyl orthosilicate, tetramethyl orthosilicate and titanium isopropoxide. The thermoset polymer is then contacted with the precursor solution so as to infuse the precursor into the thermoset polymer. The thermoset polymer with the infused precursor can then be exposed to moisture, either atmospheric moisture, or by soaking in water to hydrolyze the precursor, with the formation of —Si—OH or Ti—OH groups, followed by exposure to ambient conditions or an optional heating step to condense the hydrolyzed product to form a polymeric metal oxide phase in situ in the polymeric phase. The hydrolysis and condensation reaction may optionally be catalyzed by acid or base.

The metal oxide precursor that forms the metal oxide phase is derived from metals having a hydrolyzable leaving group that is soluble in the swelling solvent and is capable of forming an inorganic particulate phase by hydrolysis and condensation. Examples of suitable metals are electropositive metals that can replace the hydrogen of an acid and form bases with the hydroxyl radical. Preferred metals are silicon, titanium, aluminum and zirconium. Suitable precursors are $MX_3$ and $MX_4$ where M is the metal and X is halogen, alkoxy, aryloxy, carboxy or an $NR_2$ group in which R is hydrogen and/or alkyl and/or aryl. Also, other metals may be used particularly in combination with the preferred metals. Examples of such metals are boron, indium, tin, tantalum, lanthanum, iron, copper, yttrium, germanium, barium and magnesium. Preferred precursors are tetraethyl orthosilicate, tetramethyl orthosilicate, alkoxides of metals such as titanium and zirconium in which the alkoxide group contains from 1 to 12 carbon atoms. Examples include titanium, tetraisopropoxide, zirconium tetra-n-butoxide and aluminum tri-sec-butoxide.

The solvents that are used in the method of the invention are those that are capable of swelling the thermoset polymer and dissolving the precursor of the inorganic particulate phase. By swelling the thermoset polymer is meant that the thermoset polymer will experience a 1 to 15 percent, preferably 5 to 15 percent, increase in weight when immersed in the solvent for 24 hours at ambient conditions of temperature and pressure. Examples of suitable solvents include alcohols, particularly those containing from 1 to 4 carbon atoms such as methanol and ethanol, ethyl acetate, methylethyl ketone and n-methylpyrrolidone. The concentration of the precursor in the swelling solvent is typically about 5 to 90 percent by weight based on total solution weight. Other materials may be present in the treating solution. Such materials should be soluble in the solvent and be compatible with the polymeric phase and the inorganic particulate phase. Examples of such materials would be anti-static compounds and dyes.

Contacting the thermoset polymer with the above-described solutions can be achieved by immersion of the polymer in the solution. The polymeric material may be quickly dipped or soaked for longer periods of time depending upon the time needed to allow swelling and infusion of the precursor into the polymer. The time required can vary depending on the identity of the thermoset polymer chosen, the solvent and the temperature of treatment. Typically, the solutions are maintained at a temperature within the range of 0-100° C. and the immersion time will be from about 1 minute to several hours. Pressure is not critical, although higher pressure may be advantageous to promote infusion. Typically, the process is carried out at atmospheric pressure.

For hydrolysis and condensation of the precursor to occur, the thermoset polymer, after infusion, is exposed to moisture either from the atmosphere or externally supplied. Preferably, a thermoset polymer, containing the precursor, is immersed in water and more preferably under acidic or basic pH, which catalyzes the hydrolysis and condensation reactions. Examples of acidic materials are inorganic acids such as hydrochloric acid or organic acids such as formic acid. For acidic conditions, the pH is preferably not above 4. Examples of suitable bases are inorganic bases such as ammonium hydroxide and organic bases such as amines. For basic conditions, the pH is preferably 9 or more.

The thermoset polymer treated as described above is recovered and solvent, water and unreacted starting materials are removed by evaporation through air drying at ambient temperature or by heating at elevated temperature, for example at 60° C. or above, but below the decomposition temperature of the polymer. Heating not only removes unwanted materials, but also facilitates the condensation reaction. The time for heating is typically from about 15 minutes to 5 hours depending on the temperature and vapor pressure of the solvent. Optionally, heating can be under vacuum.

The depth of infusion of the inorganic particulate phase is dependent on the identity of the thermoset polymer, the swelling solvent and the conditions of infusion. Typically, the inorganic phase is dispersed in the surface regions of the polymer, that is, in the area within 100 micrometers from the surface of the polymer. Typically, at least 50 percent, more typically at least 75 percent, and most often, at least 90 percent of the inorganic phase will be dispersed in the first 100 micrometers from the surface of the thermoset polymer. The depth of infusion of the inorganic particulate phase can be determined by scanning or transmission electron microscopy.

The size of the inorganic particle depends somewhat on the conditions of hydrolysis and can vary between 10 micrometers and 10 nanometers. Basic conditions favor small particles in the nano dimensions, that is, less than 1000 nanometers, preferably less than 100 nanometers. Acidic conditions for hydrolysis favor larger size particles. The size of the particulate phase can be determined by small angle X-ray scattering and transmission electron microscopy techniques.

The content of the inorganic particulate phase in the thermoset polymer is typically no greater than 10 percent by weight and usually ranges from 0.01 to 5 percent by weight based on total weight of the thermoset polymer containing the infused inorganic dispersed particles. The content of the organic particulate phase can be determined by heating the composite to the point of decomposition of the polymer and the inorganic residue determined gravimetrically.

The composites of the invention are useful in applications where thermoset polymers are used, for example, engineering resins, except they will have modified properties due to the inorganic particulate phase. Scratch and mar resistance are significantly improved. When the dispersed inorganic particulate phase is of nano dimensions, typically less than 700 and preferably less than 100 nanometers, the composite is useful in optical applications such as lens, goggles, display devices and transparencies for motor vehicles and aircraft.

The following examples are presented to demonstrate the general principles of the invention. However, the invention should not be considered as limited to the specific examples presented. All parts are by weight unless otherwise indicated.

EXAMPLE A

With reference to the Table below, a thermoset polyurethane was prepared as follows:

A reaction vessel was equipped with a stirrer, thermocouple, nitrogen inlet, distillation container and vacuum pump. Charge A was then added and stirred with heating to 80° C.-100° C. under vacuum and held for 1 hour. The reaction mixture was then cooled to 80° C., vacuum turned off and Charge B was added to the vessel. The reaction mixture was then heated to 80° C. under vacuum and allowed to exotherm from 110° C.-120° C. The reaction mixture was then cast in place between two 5 inch by 5 inch by three sixteenths inch float glass plates which were fitted with gaskets on three sides and held together using clamps. Both glass plates had a silane release coating on their faces that contacted the polyurethane. The spacing between the plates was approximately three sixteenths of an inch. The casting cell was preheated to a temperature of about 120° C. before casting. After casting, the assembly was given a 24 hour cure at 120° C. and then a 16 hour cure at 143° C. After curing was complete, the cell was given a two hour gradual cool down cycle from the 143° C. temperature to 45° C. while remaining in the oven. The cell was removed from the oven and the glass plates were separated from the polyurethane.

TABLE

|  | Parts by Weight |
|---|---|
| Charge A | |
| 1,10-Decanediol | 61.00 |
| Trimethylolpropane | 13.41 |
| Charge B | |
| Desmodur W[1] | 131.00 |

[1]Bis(4-isocyanatocyclohexyl)methane from Bayer Material Science.

The following Examples show the infusion of various inorganic particulate phases into a thermoset polymeric phase. The thermoset polymers were contacted with various swelling solvents and various precursors that formed the inorganic particulate phase in situ.

EXAMPLE 1

Infusion of Tetramethyl Orthosilicate in Methanol

The thermoset polyurethane of Example A was immersed into a solution comprising 20.3% by weight (25% by volume) of anhydrous methanol and 79.7% by weight (75% by volume) of tetramethyl orthosilicate (TMOS) for 24 hours. The poly(urethane) was removed from the methanol/TMOS solution and placed into deionized water for three days. The poly(urethane) was subsequently placed in a vacuum oven at 100° C. for 2 hours. Transmission electron microscopy (TEM) indicated that silica particles had infused into the polyurethane phase. The silica particles had generated 250 μm into the poly(urethane) substrate. Silica nanoparticle morphology was generally spherical and the particle size ranged from 10 to 20 nm. Discrete particles and clusters of particles were seen in this specimen.

EXAMPLE 2

Infusion of Tetraethyl Orthosilicate in Ethanol

The thermoset polyurethane of Example A was immersed into a solution comprising 21.9% by weight (25% by volume) of anhydrous ethanol and 78.1% by weight (75% by volume) of tetraethyl orthosilicate (TEOS) for 24 hours. The poly (urethane) was removed from the ethanol/TEOS solution and placed into a 14% aqueous solution of ammonium hydroxide for four hours. The poly(urethane) was rinsed with water and placed into an oven at 143° C. for four hours. TEM indicated silica nanoparticles had infused into the polyurethane phase. The nanoparticles ranged in size from 10 to 70 nm with most being in the 10 nm range.

EXAMPLE 3

Infusion of Tetramethyl Orthosilicate in Xylene

The thermoset polyurethane of Example A was immersed into a solution comprising 21.7% by weight (25% by volume) of anhydrous xylene and 78.3% by weight (75% by volume) of tetramethyl orthosilicate (TMOS) for 24 hours. The poly (urethane) was removed from the xylene/TMOS solution and placed into a 14% aqueous solution of ammonium hydroxide for four hours. The poly(urethane) was rinsed with water and placed into an oven at 143° C. for four hours. TEM indicated silica nanoparticles had infused into the polyurethane phase. The nanoparticles ranged in size from 7 to 40 nanometers.

EXAMPLE 4

Infusion of Tetramethyl Orthosilicate in Ethyl Acetate

The thermoset polyurethane of Example A was immersed into a solution comprising 22.4% by weight (25% by volume) of anhydrous ethyl acetate and 77.6% by weight (75% by volume) of tetramethyl orthosilicate (TMOS) for 24 hours. The poly(urethane) was removed from the ethyl acetate/TMOS solution and placed into a 14% aqueous solution of ammonium hydroxide for four hours. The poly(urethane) was rinsed with water and placed into an oven at 143° C. for four hours. TEM indicated silica nanoparticles had infused into the polyurethane phase.

EXAMPLE 5

Infusion of Tetramethyl Orthosilicate in Dimethyl Sulfoxide

The polyurethane of Example A was immersed into a solution comprising 25% by weight (25% by volume) of anhydrous dimethyl sulfoxide (DMSO) and 75% by weight (75% by volume) of tetramethyl orthosilicate (TMOS) for 24 hours. The poly(urethane) was removed from the DMSO/TMOS solution and placed into a 14% aqueous solution of ammonium hydroxide for four hours. The poly(urethane) was rinsed with water and placed into an oven at 143° C. for four hours. TEM indicated silica nanoparticles had infused into the polyurethane phase. The nanoparticles ranged in size from 7 to 30 nanometers.

EXAMPLE 6

Infusion of Tetramethyl Orthosilicate into a Crosslinked Polyester Film

A piece of crosslinked polyester film was immersed into a solution comprising 20.3% by weight (25% by volume) of anhydrous methanol and 79.7% by weight (75% by volume) of tetramethyl orthosilicate (TMOS) for two hours. The film was removed from the methanol/TMOS solution and placed into a 14% aqueous solution of ammonium hydroxide for two hours. The film was rinsed with water for 15 minutes and allowed to dry at room temperature for 17 hours. A silica particulate phase infused into the polymeric phase. TEM indicated the nanoparticles ranged in size from 7 to 300 nm.

EXAMPLE 7

Infusion of Titanium Bis(Ethyl Acetoacetato) Diisopropoxide in Ethyl Acetate The thermoset polyurethane of Example A was immersed into a solution comprising 80.1% by weight of anhydrous ethyl acetate and 19.9% by weight of titanium bis(ethyl acetoacetato) diisopropoxide for 24 hours. The poly(urethane) was removed from the ethyl acetate/titanium bis(ethyl acetoacetato) diisopropoxide solution and placed into a 14% aqueous solution of ammonium hydroxide for four hours. The poly(urethane) was rinsed with water and placed into an oven at 143° C. for four hours. A titania particulate phase infused into the polyurethane phase. Tem indicated the nanoparticles ranged in size from 5 to 200 nm.

EXAMPLE 8

Infusion of Zirconium(IV) Acetylacetonate in Ethyl Acetate

The thermoset polyurethane of Example A was immersed into a solution comprising 91.2% by weight of anhydrous ethyl acetate and 8.8% by weight of zirconium(IV) acetylacetonate for 24 hours. The poly(urethane) was removed from the ethyl acetate/zirconium(IV) acetylacetonate solution and placed into a 14% aqueous solution of ammonium hydroxide for four hours. The poly(urethane) was rinsed with water and placed into an oven at 143° C. for four hours. A zirconia particulate phase infused into the polyurethane phase.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of forming a composite of an inorganic-thermoset polymer comprising:
    (a) contacting the thermoset polymer with a solution of the precursor of the inorganic particulate phase so as to swell the thermoset polymer
    (b) infusing the precursor into the surface region of the thermoset polymer and
    (c) subjecting the infused precursor to conditions sufficient to form an inorganic particulate phase having a particle size less than 1000 nanometers dispersed in the thermoset polymer phase.

2. The method of claim 1 in which the thermoset polymer is a polyurethane.

3. The method of claim 1 in which the precursor is derived from a metal.

4. The method of claim 1 in which the precursor is an alkoxide of a metal.

5. The method of claim 4 in which the alkoxide contains from 1 to 12 carbon atoms.

6. The method of claim 1 in which the metal is selected from silicon, titanium, zirconium, aluminum and magnesium.

7. The method of claim 1 in which the solvent is an alcohol.

8. The method of claim 7 in which the alcohol contains from 1 to 4 carbon atoms.

9. The method of claim 1 in which the thermoset polymer is swellable by the solvent for the precursor to the extent that it has from a 1 to 15 percent increase in weight when immersed in the solvent for 24 hours at ambient conditions of temperature and pressure.

10. The method of claim 3 in which during and/or after the precursor is infused into the surface of the thermoset polyurethane, the precursor is subjected to conditions sufficient to form a polymeric oxide of the metal.

11. The method of claim 10 in which the precursor is subject to conditions sufficient to hydrolyze and condense the precursor.

12. The method of claim 11 in which the precursor is an alkoxide of a metal.

* * * * *